(12) United States Patent
Mine

(10) Patent No.: US 6,724,549 B2
(45) Date of Patent: Apr. 20, 2004

(54) MAGNETIC MEDIUM TRANSFER QUALITY CONTROL DEVICE

(75) Inventor: Hironori Mine, Nagano (JP)

(73) Assignee: Fuji Electric Co., Ltd. (JP)

( * ) Notice: Subject to any disclaimer, the term of this patent is extended or adjusted under 35 U.S.C. 154(b) by 316 days.

(21) Appl. No.: 09/897,579

(22) Filed: Jul. 3, 2001

(65) Prior Publication Data
US 2002/0018378 A1 Feb. 14, 2002

(30) Foreign Application Priority Data
Jul. 3, 2000 (JP) .................................. 2000-200559

(51) Int. Cl.[7] .............................................. G11B 5/86
(52) U.S. Cl. ..................................... 360/17; 360/75
(58) Field of Search .............................. 360/15, 17, 31, 360/75

(56) References Cited
U.S. PATENT DOCUMENTS
2003/0011913 A1 * 1/2003 Hashi et al. ................. 360/17

FOREIGN PATENT DOCUMENTS
JP        2002372501 A * 12/2002 .......... G01N/21/95

OTHER PUBLICATIONS
Ishida et al, IEEE Transactions on Magnetics, "Magnetic Printing Technology—Application to HDD", vol. 39, No. 2, Mar. 2003, pp. 628–632.*

* cited by examiner

Primary Examiner—David Hudspeth
Assistant Examiner—Dan I David
(74) Attorney, Agent, or Firm—Rossi & Associates

(57) ABSTRACT

In the case where a magnetic transfer process is used to record a specific magnetic pattern during the magnetic disk manufacturing process, a read/write tester for conducting a glide height test and a read/write test and a particle testing means are provided at the front section of a magnetic transfer device. The tester records a specific magnetic pattern onto a magnetic disk in a magnetic transfer method. An optical testing device, a read/write tester for conducting a glide height test, and a read/write test in sampling are provided at the rear section of the device. This enables the detection of consecutive disk abnormalities caused by particles, which are adhered a master disk or put between the magnetic disk and the master disk. A transfer quality control device collects the results of the respective tests, so that the quality can be controlled using the results. Accordingly, the present invention assures the desired quality of a magnetic disk produced after transfer.

4 Claims, 5 Drawing Sheets

MAGNETIC MEDIUM TRANSFER QUALITY CONTROL DEVICE

BACKGROUND OF THE INVENTION

1. Field of the Invention

This invention relates to a magnetic disk medium quality control method and, more particularly, to a magnetic medium transfer quality control device that detects abnormal conditions in a magnetic disk medium, which stores servo information required for controlling a head position of a magnetic disk device, in a magnetic transfer process.

2. Description of Related Art

A magnetic disk device is widely used as a storage device for storing a variety of digital data and comprises a magnetic disk and a magnetic head. The magnetic head stores and regenerates data on and from the magnetic disk. The magnetic disk must perform a servo operation, in which the head is moved to a desired track so as to read out a desired recording track, and is positioned at a center of the track. This servo operation stores a servo pattern, which is used for acquiring data about the position of the head, on the magnetic disk. Normally, a device called a servo writer writes this servo pattern after a magnetic disk device manufacturer assembles a magnetic disk, a magnetic head, and the like, in one body. The servo writer writes the servo pattern by gradually moving the head from outside. Recently, however, storage capacities of magnetic disk devices have been rapidly increasing. Accordingly, the number of tracks in the disk device has also been increasing. This increases the period of time required for writing the servo pattern and results in increasing manufacturing costs for the disk device.

To address this problem, there have been developed methods of writing the servo pattern by magnetic transfer. In one example of known methods, a so-called master disk, in which a servo pattern has already been written, is adhered to a magnetic disk from which the servo pattern has already been erased. In another example, a master disk in which a pattern is structurally formed by a ferromagnetic substance is adhered to a magnetic disk, and a magnetic field is applied to the magnetic disk from outside of the master disk.

Although a disk device manufacturer can perform the magnetic transfer process, it is preferable for a magnetic disk medium manufacturer to perform the magnetic transfer process in a single step of the magnetic disk manufacturing process, because the disk is only used before it is incorporated into a disk device and thus requires a clean room. Hereinafter, a disk that is subjected to magnetic transfer in the magnetic transfer process will be called a transfer disk. A transfer disk used as a magnetic disk product in which a servo signal is normally written by magnetic transfer will be called a magnetic transfer disk.

If such a magnetic transfer process is incorporated into the medium manufacturing process, there is a problem in testing the medium. The problem will be described hereinbelow.

FIG. 4 shows an example of a typical manufacturing process after a magnetic film has been formed on a magnetic disk, in which the magnetic transfer has not yet been performed. In this example, a magnetic film is formed by sputtering, and a lubricant is then coated thereon (refer to step 1 and step 2). A tape cleaning is performed so as to remove particles on a surface (refer to step 3), and a total test is finally conducted. The testing process comprises a glide height test (refer to step 4), a read/write test (refer to step 5), and a visual test (refer to step 6). In the glide height test, it is determined whether there is such a bump as to interfere with the head provided with a piezoelectric element when the head is being used. In the read/write test, the number of defects present on a disk is determined by writing and reading a signal in or from the disk, using the same head as in the disk device. In the visual test, the presence of any scratches or pits in the surface of the disk is determined visually or by using an optical testing device. These testing processes assure the quality of shipped products, because nothing touches the recording surfaces of disks during these processes, since they are typically performed at the final stage of the medium manufacturing process.

On the other hand, FIG. 5 shows an example of a manufacturing process after a magnetic film has been formed on a magnetic disk in the case in which a magnetic transfer process is added. If the read/write test is conducted after the magnetic transfer process, the servo pattern written by the magnetic transfer will be erased. To solve this problem, the read/write test (refer to S5) must be conducted prior to magnetic transfer (refer to S7). The glide height test does not have to be conducted prior to the magnetic transfer, but if the glide height test is not conducted prior to the read/write test, the read/write test will be conducted when the disk has a bump that will interfere with the head, which is the glide height defect. This increases the number of damaged test heads occurring during the read/write test, and results in increased testing costs. Moreover, a single testing device conducts both the glide height test and the read/write test in many cases. For these reasons, the glide height test and the read/write test has been advantageously conducted prior to the magnetic transfer process, as shown in FIG. 5. However, since a servo pattern written by the magnetic transfer is not erased during the visual test (refer to S8), the visual test may be performed at the final stage after the magnetic transfer process.

In the magnetic transfer process as stated above, the master disk adheres to the magnetic disk to be manufactured (the transfer disk). This sometimes causes damage to the surface of the transfer disk, and this damage to the disk may affect the read/write action. Particularly if particles are introduced into the space between the master disk and the transfer disk during the magnetic transfer process, the distance between the master disk and the transfer disk is increased in the area immediately surrounding the introduced particles. This may inhibit the magnetic transfer signal from being normally recorded. Further, the particles may cause damage to the master disk and the transfer disk.

To avoid this problem, whether any particles are being introduced onto the transfer disk is preferably determined in a test for particles (refer to S6) just prior to magnetic transfer. In an example of this test for particles the disk is irradiated with a laser beam, so as to identify any particles introduced onto the disk by the presence of scattered light. In this method, however, it is impossible to completely prevent the introduction of particles, which are adhered to the disk between the test for particles and the magnetic transfer, particularly the fine particles that have escaped detection by the test for particles, which accumulate on the master disk and become larger particles.

If the particles adhere to the master disk as described above, the transfer disks made thereafter are unsatisfactorily manufactured by the magnetic transfer process. Further, since the read/write test cannot be conducted after the magnetic transfer process, as described above, the read/write test cannot assure the quality of the magnetic transfer disk. It would therefore desirable to provide a device to assure the quality of the magnetic transfer disk.

SUMMARY OF THE INVENTION

A magnetic transfer quality control device is provided to assure the quality of a magnetic transfer disk. In a preferred embodiment, the device includes a first read/write testing mechanism provided at the front section of a magnetic transfer device, the first read/write testing mechanism conducting a glide height test and a read/write test, a test for particles testing mechanism; an optical surface testing mechanism provided at the rear section of the magnetic transfer device; a second read/write testing mechanism for conducting a sampling glide height test and a sampling read/write test; an information collecting mechanism for collecting at least one of test results obtained by the respective testing mechanism; and a determination mechanism for making a predetermined determination according to the collected information about the test results to determine whether there are any abnormal conditions in the magnetic transfer process.

The most serious problem occurring in the magnetic transfer process is that the consecutive disks are made defective due to the particles adhering to the master disk or introduced into the space between the master disk and the transfer disk. The resulting damage on the transfer disk can be detected by optical testing after the magnetic transfer. Thus, an optical testing device monitors whether a plurality of consecutive transfer disks is defective or not. If yes, a warning, for example, an alarm, is given.

If the particles introduced into the space between the master disk and the transfer disk cause only a minor damage, this does not necessarily cause a problem to occur in operating the disk device. If the optical testing device determines that the transfer disk is defective due to such a minor defect, the ratio of non-defectives to defectives is lowered. To address this problem, the results of the sampling glide height test and read/write test are compared with the results of the optical test, so as to check whether the defects are located at the same position or not. Whether the standards for the optical test should be stricter or more flexible may determined according to the previous results of the checking process.

However, the greatest cause for particles to be introduced into the space between the master disk and the transfer disk is that particles sometimes adhere to the transfer disk being subjected to the magnetic transfer step. To prevent this, a test for particles is conducted before the magnetic transfer process as stated above. It is, however, impossible to detect all defects, including those caused by fine particles, and to remove any transfer disks to which such fine particles have adhered. Ordinarily, if the ratio of non-defectives to defectives in the test for particles is low, a greater proportion of particle-associated damage is being eliminated by the test for particles. It is therefore important to give an alarm when the ratio of non-defectives in the test for particles becomes lower than a predetermined value.

According to the present invention, one or more of above-mentioned methods are used to assure a desired quality of the magnetic transfer disk being manufactured.

BRIEF DESCRIPTION OF THE DRAWINGS

The invention will be described with reference to certain preferred embodiments thereof along with the accompanying drawings, wherein.

DETAILED DESCRIPTION OF PREFERRED EMBODIMENTS

Figure 1:
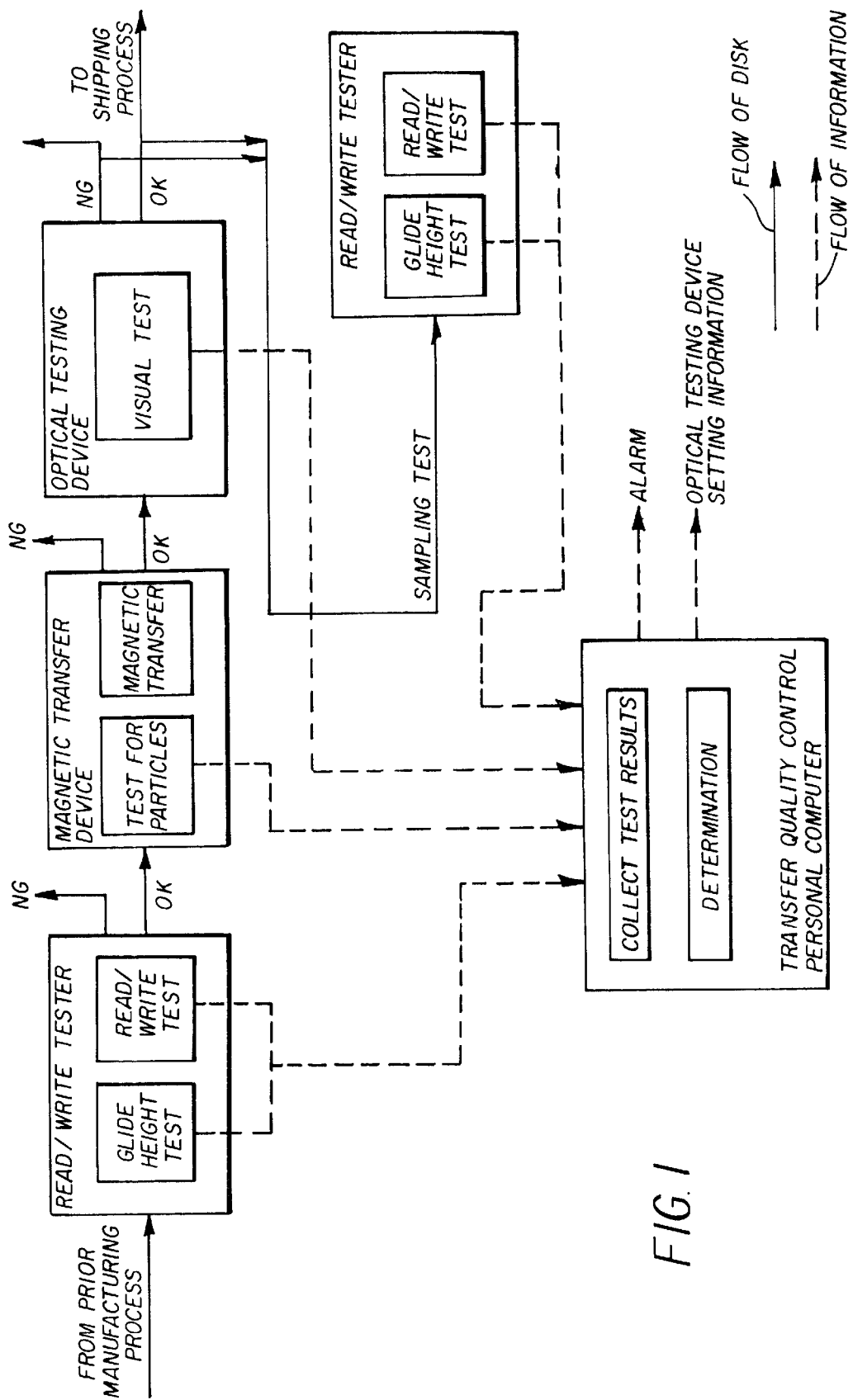
FIG. 1 is a block diagram showing an embodiment of the present invention.

FIG. 1 is a block diagram showing an embodiment of the present invention. As stated previously, a glide height test and a read/write test are conducted prior to the magnetic transfer process. A single read/write tester 11 conducts these two tests. Data concerning the number of defects in the glide height test and the positions thereof on each surface of the transfer disk, data concerning the number of defects and the positions thereof in the read/write test, and so forth, can be obtained from the read/write tester 11. Such test result data are read from the read-write tester 11 and stored on a transfer quality control personal computer 4.

A magnetic transfer device 2 then records a servo pattern. As described above, the adhesion of particles to a master disk causes problems. To avoid these problems, a test for particles is conducted prior to the magnetic transfer process, so as to determine whether particles are adhered to the transfer disk or not. The results of this test for particles, such as the number of particles present, are forwarded to the transfer quality control personal computer 4.

When particles are adhered to the surface of a disk, it is determined as being defective in the test for particles. Most particles, however, can be easily removed. Thus, the disks that are determined to be defective by the test for particles are stored for a while. If and when a certain number of such disks have accumulated, the disks go again through the entire process, beginning with a tape cleaning process, as in FIG. 1. This enables many disks to pass the test for particles, so that the magnetic transfer can be completed on these disks.

After the magnetic transfer process, an optical testing device 3 carries out a visual test for all disks. In the visual test, it is determined whether there are any abnormalities on the surfaces of the disks, such as pits, scratches and bumps. The optical testing device 3 scans the entire surface of the disk, including the innermost peripheral part (the part at the inner diameter) and the outermost peripheral part (the part at the outer diameter) as well as a data zone. For example, an optical testing device 3 may irradiate a laser beam onto the surface of the disk and detect the variations in the quantity of reflected and scattered light, the presence of which indicates that there are abnormalities on the surface. If the particles are introduced into the space between the master disk and the transfer disk during the magnetic transfer, a pit is typically formed on the disk, and a bump is typically formed around the pit. The optical testing device 3 needs to detect these defects.

When the optical testing device 3 detects a pit or a bump, it is impossible to determine whether they have been formed in the magnetic transfer process or not. However, even if particles are introduced between a certain transfer disk and the master disk, there is no big problem, since the transfer disk would only be identified as being defective if the particles fall and do not adhere to the master disk. The particles introduced during the magnetic transfer process only cause a big problem in the case where the particles continue to adhere to the master disk, thus forming pits or bumps around them in all subsequent transfer disks. To avoid this, the adhesion of particles to the master disk in the magnetic transfer process needs to be detected quickly, and a manufacturing line must be stopped temporarily to clean the master disk or to replace the master disk with another.

In the easiest method for determining whether or not the particles are adhered to the master disk, the transfer quality control personal computer 4 gives an alarm when the optical testing device 3 determines a plurality of consecutive transfer disks as being defective (refer to steps 1–4). In this method, it is impossible to determine whether a plurality of consecutive transfer disks has been made defective by a process other than the magnetic transfer process or during the magnetic transfer process itself. An operator who receives the alarm must make this determination.

Figure 2:
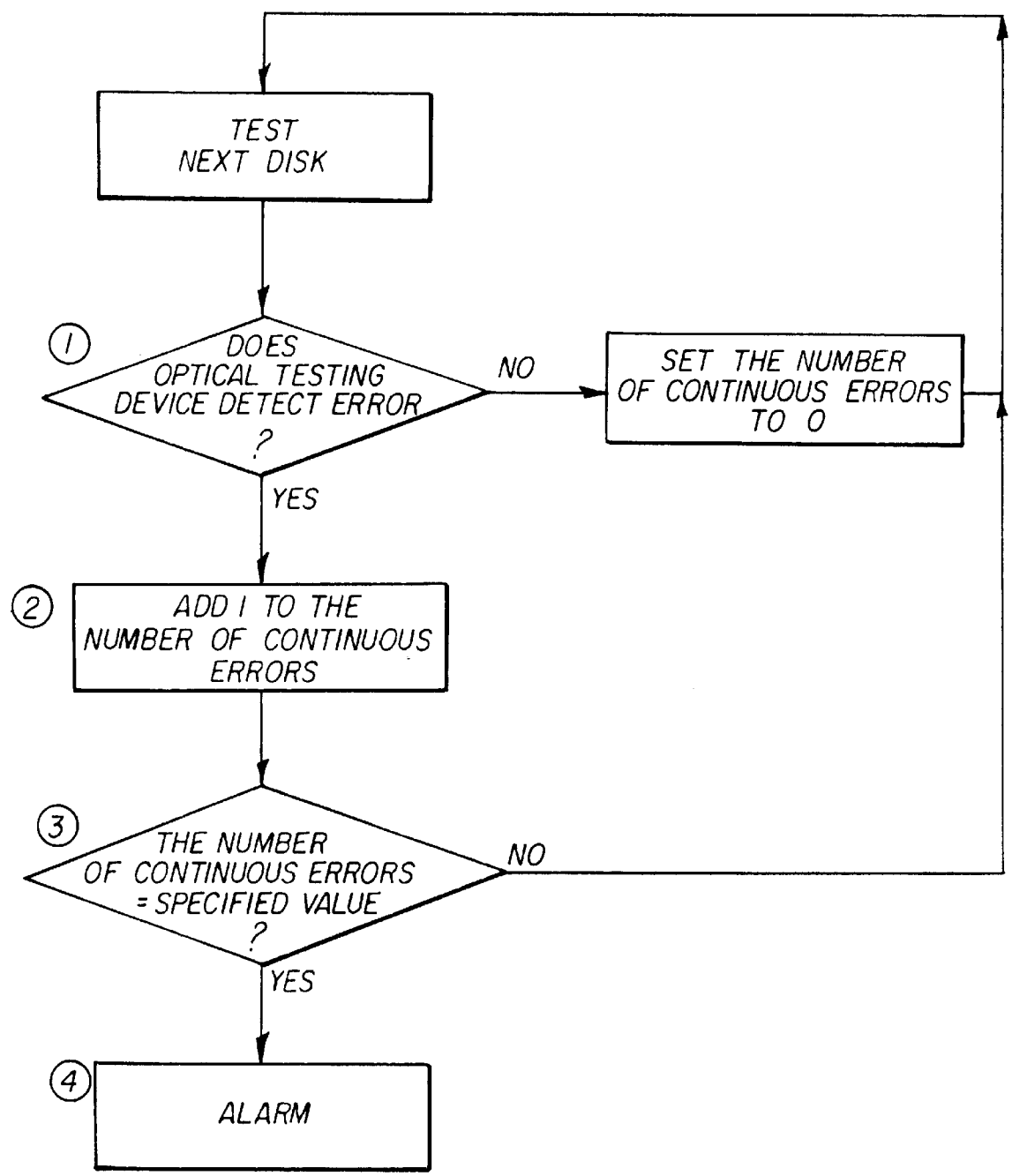
FIG. 2 is a flow chart showing an example of a method for determining whether there is an abnormal condition in the magnetic transfer process of FIG. 1.
Figure 3:
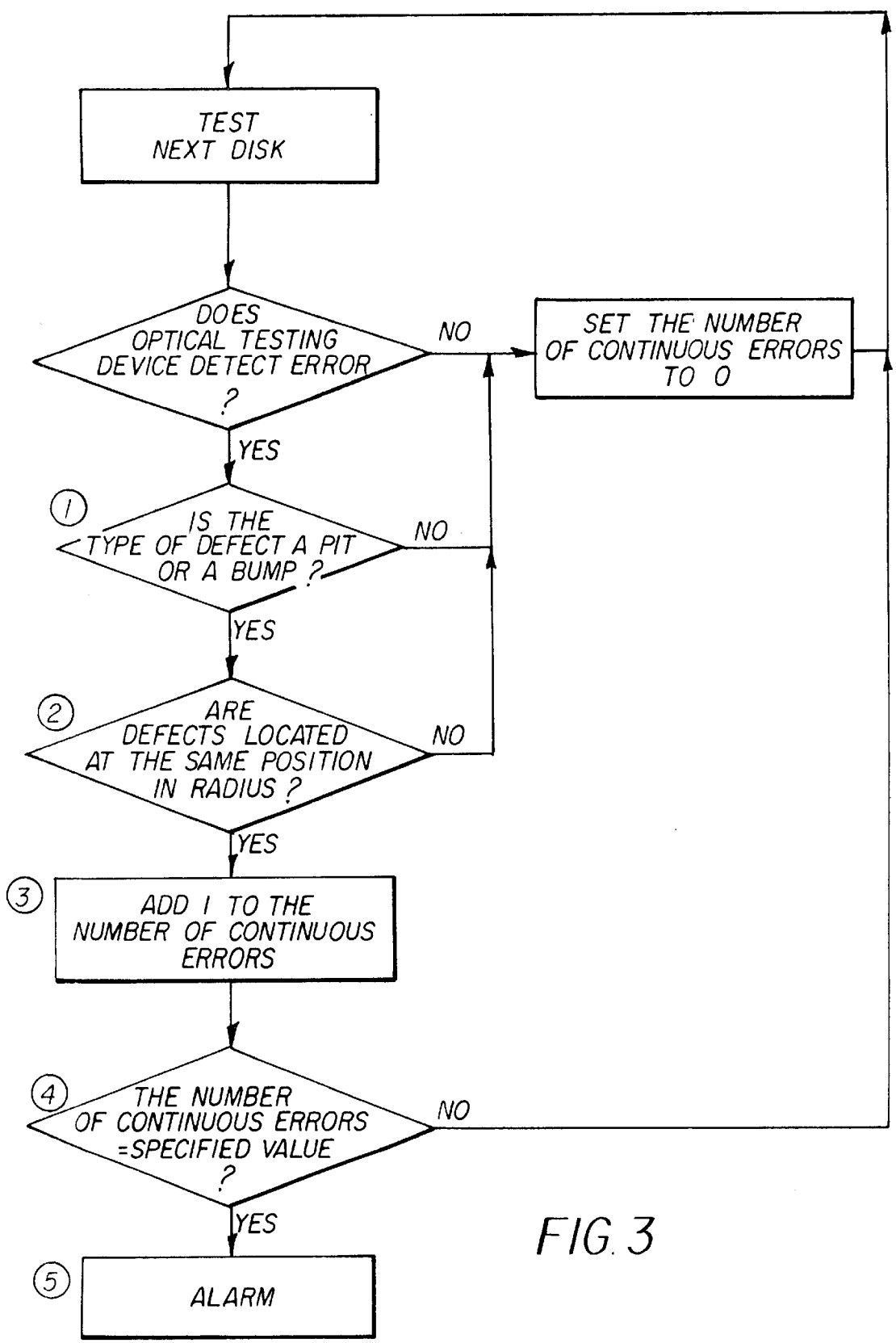
FIG. 3 is a flow chart showing another example of a method for determining whether there is an abnormal condition in the magnetic transfer process of FIG. 1.
Figure 4:
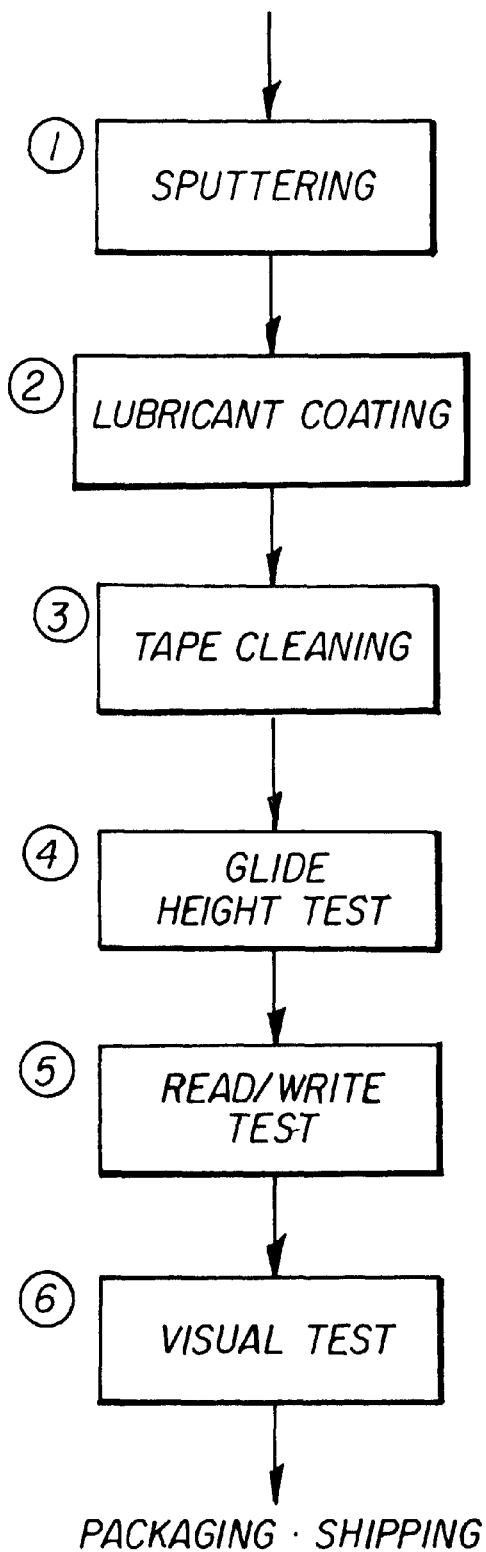
FIG. 4 is a diagram of assistance in explaining a process for manufacturing a magnetic disk that does not perform magnetic transfer.
Figure 5:
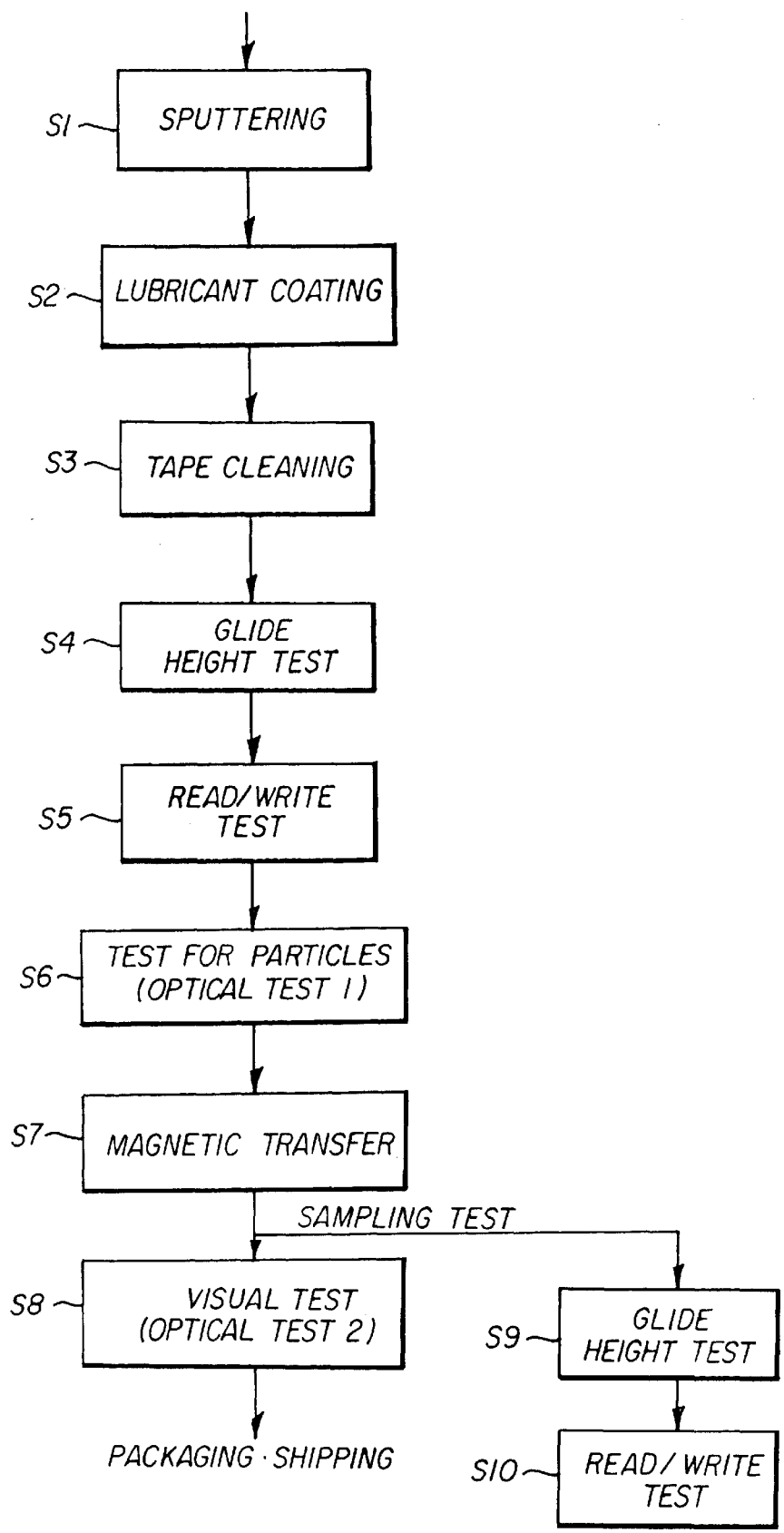
FIG. 5 is a diagram of assistance in explaining a process for manufacturing a magnetic disk that performs magnetic transfer.

FIG. 3 shows a determination algorithm for limiting the conditions. First, whether a plurality of consecutive transfer disks is defective or not is determined as described with reference to FIG. 2. If a plurality of consecutive transfer disks is defective, it is determined whether the type of the defect detected by the optical testing device is a pit or a bump (refer to step 1). It is then determined whether the defects are located at the same position (refer to 2). If both of these conditions are satisfied, it is determined whether the abnormal conditions such as the adhesion of particles occur in the master disk (refer to steps 3–5).

Positional information about the defects can be obtained with respect to positions in both a radial direction and an angular direction of the disks. A reference position in the angular direction, however, cannot necessarily be maintained at the same position if the disk moves to another testing device. For this reason, whether the defects are located at the same position or not is determined according to whether the defects are located at the same position in the radius direction (refer to 2). Although there is a slight possibility that the pits or the bumps are formed on a plurality of consecutive disks due to some process other than the magnetic transfer process, such defects occur mainly in the magnetic transfer process. Therefore, there is hardly any problem if it is determined that the magnetic transfer process causes the defects.

If a plurality of consecutive transfer disks is determined as being defective due to the adhesion of particles to the master disk in the above-described determination method, the transfer quality control personal computer 4 gives an alarm to an operator in a manufacturing line. For example, an alarm sound is given. Further, a message indicating that the adhesion of particles is causing a plurality of consecutive transfer disks to be defective may be displayed on a monitor screen of transfer quality control personal computer 4, so as to alert the operator to clean the master disk or replace the master disk with another.

The optical testing device 3 cannot find all defects of magnetic disks, and the read/write test cannot be conducted after the magnetic transfer. For this reason, according to the embodiment shown in FIG. 1, the glide height test and the read/write test are conducted for several sampled disks after the magnetic transfer process, so as to confirm the quality of final products (refer to the read/write tester 12). Servo signals written by the magnetic transfer process are erased from the samples disks, but disks that are determined as being non-defective in the sampling read/write test can undergo the tests beginning from the magnetic transfer process.

Of course, the results of the sampling glide height test and read/write test can be handled in the same manner as the results of the visual test conducted by the optical testing device. In this case, if a plurality of consecutive disks has defects at the same position, it is determined that the disks are made defective due to the magnetic transfer process. In the case of the read/write test, however, it is impossible to clearly determine that magnetic transfer has caused the abnormalities, compared with the case where the results of the visual test are used, because even non-defective disks have some defects, and the type of defects cannot be determined clearly, as compared with a visual test. If the read/write test is conducted prior to the magnetic transfer as shown in FIG. 1, media that are determined to be defective in the read/write test after the magnetic transfer are almost certainly made defective in the magnetic transfer process. It is, therefore, preferable to determine that the magnetic transfer process has caused disk abnormalities on the basis of the consecutive detection of defective disks in the sampling glide height test and the read/write test after magnetic transfer.

If the magnetic transfer is performed, the optical testing device 3 must confirm the quality of final products after the magnetic transfer. It is therefore preferable to set the conditions of the optical testing device 3 to be as close as possible to those of a magnetic read/write test. Therefore, according to the present invention, the results of the sampling glide height test and the read/write test after the magnetic transfer and the results of the visual test conducted by the optical testing device 3 are collected in the transfer quality control personal computer 4 and are automatically compared with each other. This provides information that is useful in setting the conditions of the optical testing device. In one method of providing the information, the ratios of the following defects to the total number of defects detected by the respective testing devices are calculated, and the results of the calculation are displayed on the monitor screen of the transfer quality control personal computer:

1) defects detected at the same position in the glide height test or the read/write test and the visual test;

2) defects detected only in the glide height test;

3) defects detected only in the read/write test; and 4) defects detected only in the visual test.

If the ratios 2) and 3) are high, the conditions of the optical testing device are strictly set. If the ratio 4) is high, the conditions of the optical testing device are relaxed.

The results of the test for particles prior to the magnetic transfer are also collected in the transfer quality control personal computer 4 in FIG. 1. The amount of particles adhered to each surface is collected as a result of the test for particles. Although large particles can be detected as causing defective disks in the glide height test, some of small particles cannot be detected in the glide height test. Even small particles, however, may contribute to the accumulation of particles. If the number of particles increases in the environment of the manufacturing line due to the deterioration of the environment, the offending particles may be omitted from the detection system with respect to both the glide height test and the test for particles. This increases the amount of particles coming into contact with the master disk. Finding such a situation as quickly as possible is therefore important in assuring magnetic transfer quality. If the number of particles increases due to the deterioration of surrounding environment, as stated above, the number of particles that are detected by the test for particles and the number that cannot be detected by the test for particles both increase at the same time. Thus, it is possible to detect an increase in the number of adhered particles by time-series, for example, by constructing a histogram representing the number of adhered particles as detected in the test for particles. In short, the ratio of non-defectives in the test for particles is monitored, and when the ratio of non-defectives becomes lower than a specified value, the transfer quality control personal computer 4 gives an alarm.

According to the embodiment shown in FIG. 1, the glide height test and the read/write test are conducted for all the media before the magnetic transfer process. If, however, the quality of media to be manufactured satisfies the required quality, it is possible to replace one or both of the glide height test and the read/write test with the visual test conducted by the optical testing means. This would achieve the effects except for the above-described effect relating to the glide height test or the read/write test conducted before magnetic transfer. It is also very important to optimize the conditions of the visual test by using the results of the glide height test and the read/write test after the magnetic transfer process.

According to the present invention, it is possible to quickly detect abnormal conditions of consecutive transfer disks caused by the magnetic transfer in which particles become adhered to the master disk, and to detect the presence of damage on the transfer disks caused by the abnormal conditions. It is also possible to optimize the conditions of the optical testing device, which confirms quality after the magnetic transfer, and quickly detect a state in which a deterioration in the environment of the manufacturing line is increasing the number of particles adhering to the master disk. The present invention therefore provides an overall transfer quality control system that is capable of maintaining satisfactory quality in the magnetic transfer process.

What is claimed is:

1. A magnetic medium transfer quality control device for use in a magnetic disk manufacture line, in which a magnetic transfer process is performed by bringing a master disk, on which magnetic properties have previously been formed in a predetermined pattern, into contact with a magnetic disk to write a magnetic servo pattern, said magnetic medium transfer quality control device comprising:

data collection means for collecting data from the results of at least one of the following tests: a glide height test, a read/write test and a test for particles conducted before said magnetic transfer process; a visual test, a sampling glide height test and a sampling read/write test after said magnetic transfer process; and determination means for making a predetermined determination according to the collected data concerning test results to determine whether or not there is an abnormal condition in said magnetic transfer process.

2. A magnetic medium transfer quality control device according to claim 1, wherein said determination means determines a plurality of consecutive disks as being defective in said visual test, said sampling glide height test or said sampling read/write test, after said magnetic transfer process.

3. A magnetic medium transfer quality control device according to claim 1, wherein said determination means compares the respective results of said sampling glide height test and said sampling read/write test after said magnetic transfer process with the results of said visual test after said magnetic transfer process, thereby enabling output of data for use in optimizing a set value for determining whether magnetic disks are defective or not.

4. A magnetic medium transfer quality control device according to claim 1, wherein said determination means is capable of determining that a result of said test for particles before said magnetic transfer process is worse than a predetermined value.

* * * * *